(12) United States Patent
Joe et al.

(10) Patent No.: US 7,412,550 B2
(45) Date of Patent: Aug. 12, 2008

(54) BUS SYSTEM WITH PROTOCOL CONVERSION FOR ARBITRATING BUS OCCUPATION AND METHOD THEREOF

(75) Inventors: Kee-Won Joe, Yongin-si (KR); Jong-Ho Kim, Seoul (KR); Hae-Young Rha, Seoul (KR); Jong-Chul Shin, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 142 days.

(21) Appl. No.: 11/035,741

(22) Filed: Jan. 18, 2005

(65) Prior Publication Data
US 2005/0204084 A1    Sep. 15, 2005

(30) Foreign Application Priority Data
Feb. 20, 2004    (KR) .................. 10-2004-0011427

(51) Int. Cl.
*G06F 13/00* (2006.01)
(52) U.S. Cl. .................. 710/110; 710/113; 710/309; 710/240
(58) Field of Classification Search ......... 710/105–119, 710/240–244, 309–312, 20–22
See application file for complete search history.

(56) References Cited

U.S. PATENT DOCUMENTS 5,377,331 A    12/1994   Drerup et al.
5,649,209 A *   7/1997   Umetsu et al. ............. 710/266
6,078,976 A     6/2000   Obayashi ................... 710/128
6,823,410 B2 * 11/2004   Koike ........................ 710/107
6,910,087 B2 *  6/2005   Stuber et al. ............... 710/110
6,941,434 B2 *  9/2005   Uneyama et al. ........... 711/167
2002/0129181 A1* 9/2002  Lahiri et al. ............... 710/113
2002/0147871 A1 10/2002  Koike
2003/0035471 A1  2/2003  Pitsoulakis
2003/0229741 A1 12/2003  Stuber et al.
2004/0107265 A1* 6/2004  Yasunaga ................... 709/213
2005/0138253 A1* 6/2005  Chae ......................... 710/110

FOREIGN PATENT DOCUMENTS

| EP | 0271582     | 5/1987 |
| JP | 63-182933 A | 7/1988 |
| JP | 2-53161 A   | 2/1990 |
| JP | 9-73430 A   | 3/1997 |

OTHER PUBLICATIONS

European Foreign Search Report, Apr. 7, 2005.
German Office Action dated Nov. 16, 2006.

\* cited by examiner

*Primary Examiner*—Raymond N Phan
(74) *Attorney, Agent, or Firm*—Harness Dickey & Pierce (57) ABSTRACT

A bus system including a bus arbiter and a plurality of masters. The bus arbiter grants bus control to one of the plurality of masters. When a master with bus control sends a read command, bus control is transferred to another one of the plurality of masters, thereby increasing the efficiency of the bus system. A method including sending a read command and transferring bus control to another one of a plurality of masters before receiving the response to the read command.

52 Claims, 6 Drawing Sheets

Fig. 1

(Conventional Art)

Fig. 2

(Conventional Art)

Fig. 3

(Conventional Art)

BUS SYSTEM WITH PROTOCOL CONVERSION FOR ARBITRATING BUS OCCUPATION AND METHOD THEREOF

CROSS-REFERENCE TO RELATED APPLICATIONS

This U.S. non-provisional patent application claims priority under 35 U.S.C. § 119 of Korean Patent Application 2004-11427 filed on Feb. 20, 2004, the entire contents of which are hereby incorporated by reference.

BACKGROUND OF THE INVENTION

1. Field of the Invention

The present invention is directed generally to a bus system and method thereof, and more particularly to a bus system including an efficient bandwidth and method thereof.

2. Description of the Related Art

A conventional system-on-chip (SOC) may include a plurality of integrated circuit chips in a single chip board. Conventional SOCs may include time-to-market as a factor during development. Intellectual property (IP) cores may be reused (i.e., recycled) in order to reduce the time-to-market for conventional SOCs. The reuse of the IP cores may also improve the reliability of new SOC devices since the IP cores selected for reuse may come from functioning SOCs and there is a high probability that the reused IP core will operate correctly.

A bus system may be selected for a SOC to provide communication (i.e., data transfers) between IP cores within the SOC. A conventional bus system may include an advance high-performance bus (AHB) system which may be based on an advanced microcontroller bus architecture (AMBA). A silicon backplane (SB) micro-network may also be included in the bus system. The SB micro-network may be based on an open core protocol (OCP). Since the bus system may include both OCP and AMBA, there may exist a requirement within the bus system to translate between protocols (e.g., between OCP and AMBA and vice versa).

Figure 1:
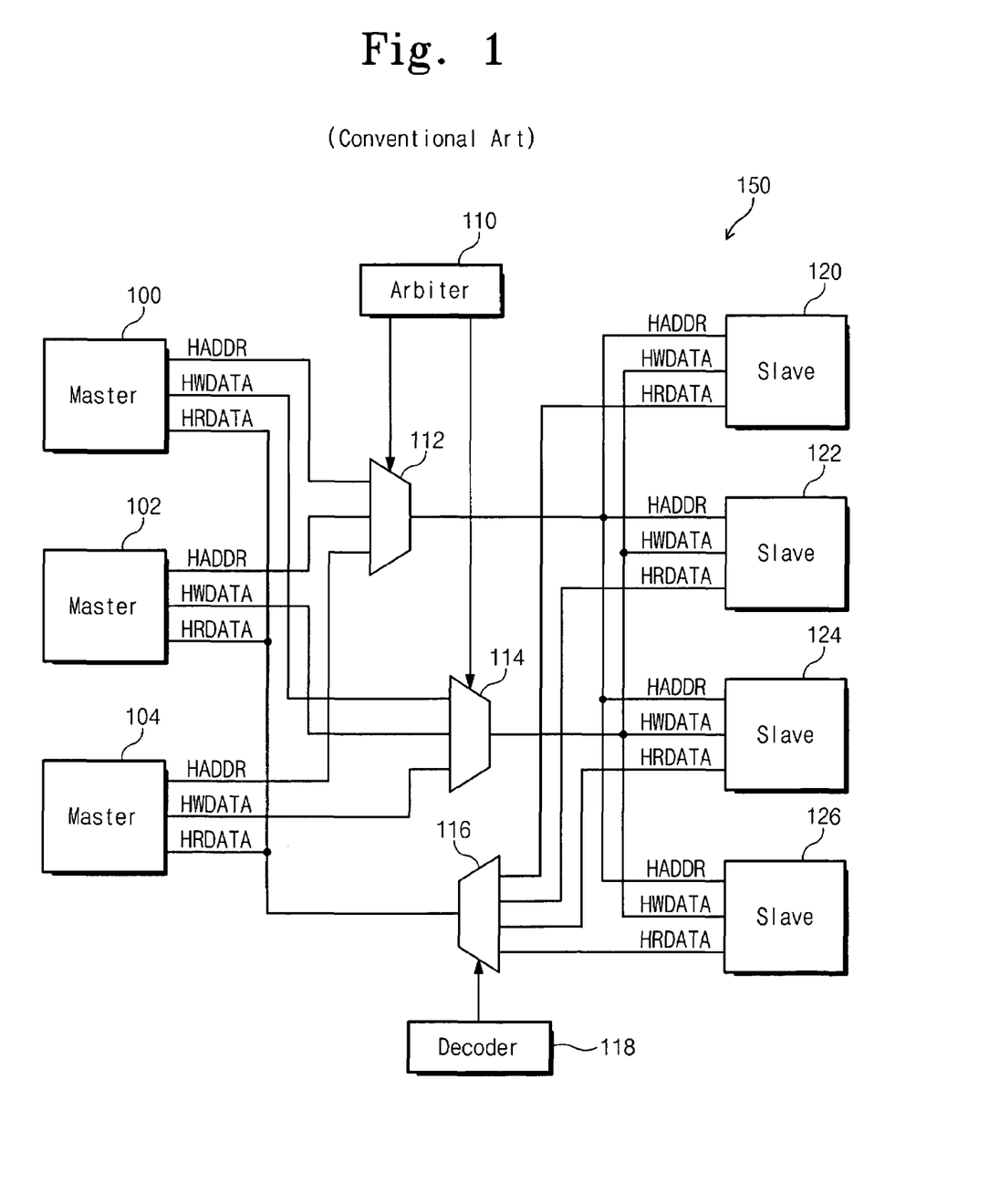
FIG. 1 illustrates a block diagram of a conventional advance high-performance bus (AHB) system.

FIG. 1 illustrates a block diagram of a conventional AHB system 150.

Referring to FIG. 1, the AHB bus system 150 may include masters 100/102/104, slaves 120/122/124/126, an arbiter 110, a decoder 118, and multiplexers 112/114/118.

The masters 100/102/104 may request bus occupation (i.e., bus control or bus bandwidth on which to transfer data) from the arbiter 110 in order to read or write data to or from the slaves 120/122/124/126. The arbiter 110 may grant the bus occupation to a single one of the masters 100/102/104 in response to the bus request based on priorities among the masters 100/102/104 and which master occupies the bus at the time of the request. A master which is granted bus occupation (i.e., a bus master) may read or write data with one of the slaves 120/122/124/126. Once designated as the bus master, the bus master may transfer data on the bus until its data transfer is completed. While the bus master transfers data on the bus, there may exist a queue of masters in a standby state (i.e., masters which have requested bus occupation).

Another conventional OCP bus system may function differently than the above-described AHB bus system 150 of FIG. 1. While the AHB system may include a bus master which may control the bus until its data transfer is completed, the OCP bus system may only allow the bus master to control the bus until data transfer is completed during a read operation (i.e., not during a write operation). Thus, when a bus master generates a write command in a conventional OCP bus system, a read command for data is first transferred (i.e., in order to acquire data associated with the write command) and the master may transfer bus control to a new master (i.e., a master with the highest priority on the standby queue). Also, data transferred in response to a read command may be sent to the master (i.e., the master which generated the read command) through an agent. Thus, the conventional OCP bus system may be more efficient than the conventional AHB bus system (e.g., AHB bus system 150 of FIG. 1).

Figure 2:
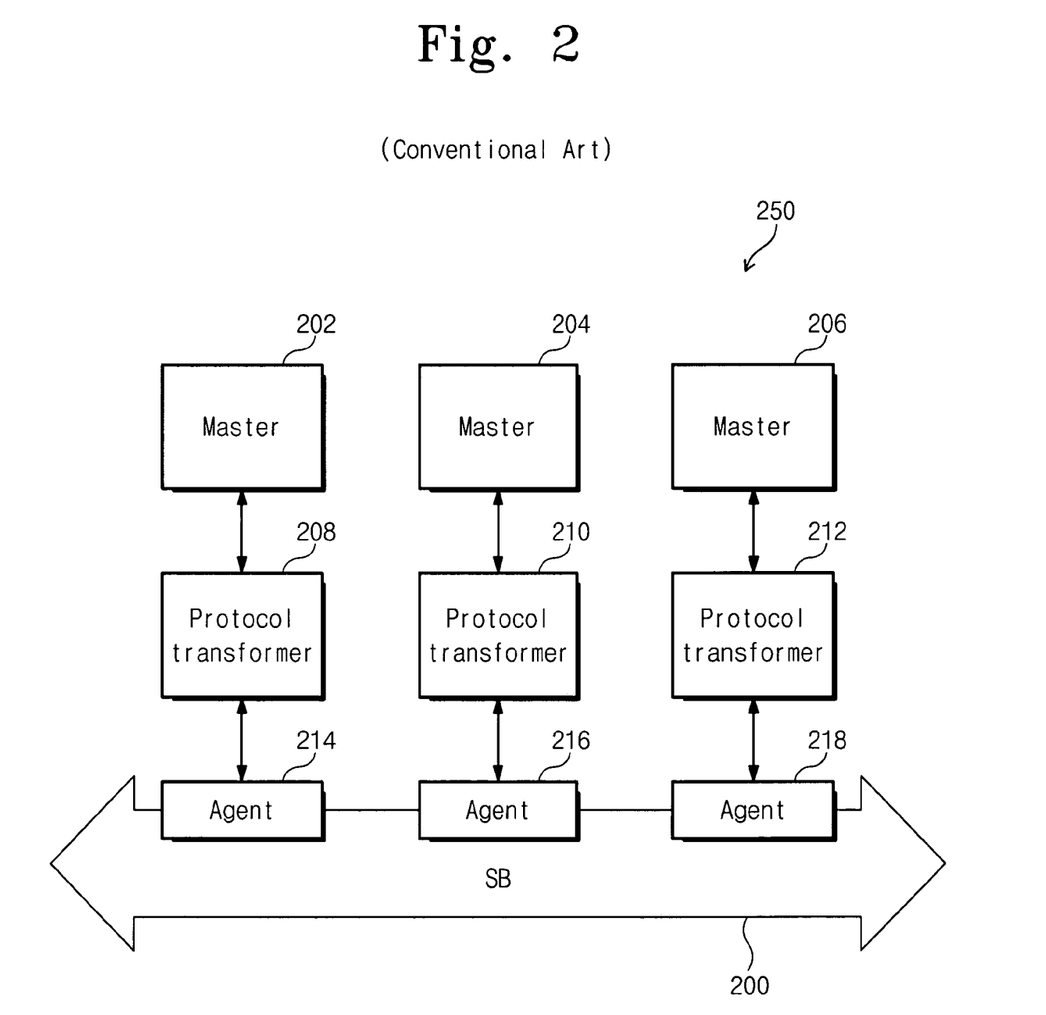
FIG. 2 illustrates a block diagram of a conventional silicon backplane (SB) micro-network including an open core protocol (OCP) bus system.

FIG. 2 illustrates a block diagram of a conventional SB micro-network 250 including an OCP bus system.

Referring to FIG. 2, the SB micro-network 250 may include masters 202/204/206, protocol transformers 208/210/212, agents 214/216/218 and an SB bus 200.

Referring to FIG. 2 the masters 202/204/206 may be designed based on the AMBA protocol which may be associated with the AHB system. The masters 202/204/206 may be connected to protocol transformers 208/210/212, respectively, in order to perform a conversion to and from the AMBA protocol and the OCP. The protocol transformers 208/210/212 may be connected to a SB bus 200 through agents 214/216/218 which may be included within a SB micro-network. The agents 214/216/218 may be connected to each other through the SB bus 200, thereby allowing data transfer between the masters 202/204/206. The agents 214/216/218 may transfer a read command to slaves (not shown) from the masters 202/204/206, and data may be transferred from the slaves to the masters 202/204/206 in response to the read command.

Each of the masters 202/204/206 may be connected to the SB bus 200 through the agents 214/216/218, and the number of the masters may limit a clock frequency of the SB bus 200.

A conventional SOC may include a plurality of masters and slaves. If each of the plurality of masters and slaves (i.e., IP cores) are connected to a bus (e.g., SB bus 200), the clock frequency of the bus may be degraded. Further, a number of agents (e.g. agents 214/216/218) attached to the bus (e.g., SB bus 200) may increase the physical size of the bus.

Conventional methods of solving the above-described problems may include grouping a plurality of masters into several blocks as sub-systems (i.e., grouping masters performing similar functions) with the sub-systems connected to the bus. Thus, a number of connections to the bus may be reduced since each group of masters may include only a single connection to the bus, and not an individual bus connection for each master. However, the above-described solution requires arbitration within the bus groups, since only one master within the bus groups may be connected through the group to the bus at a given time.

Figure 3:
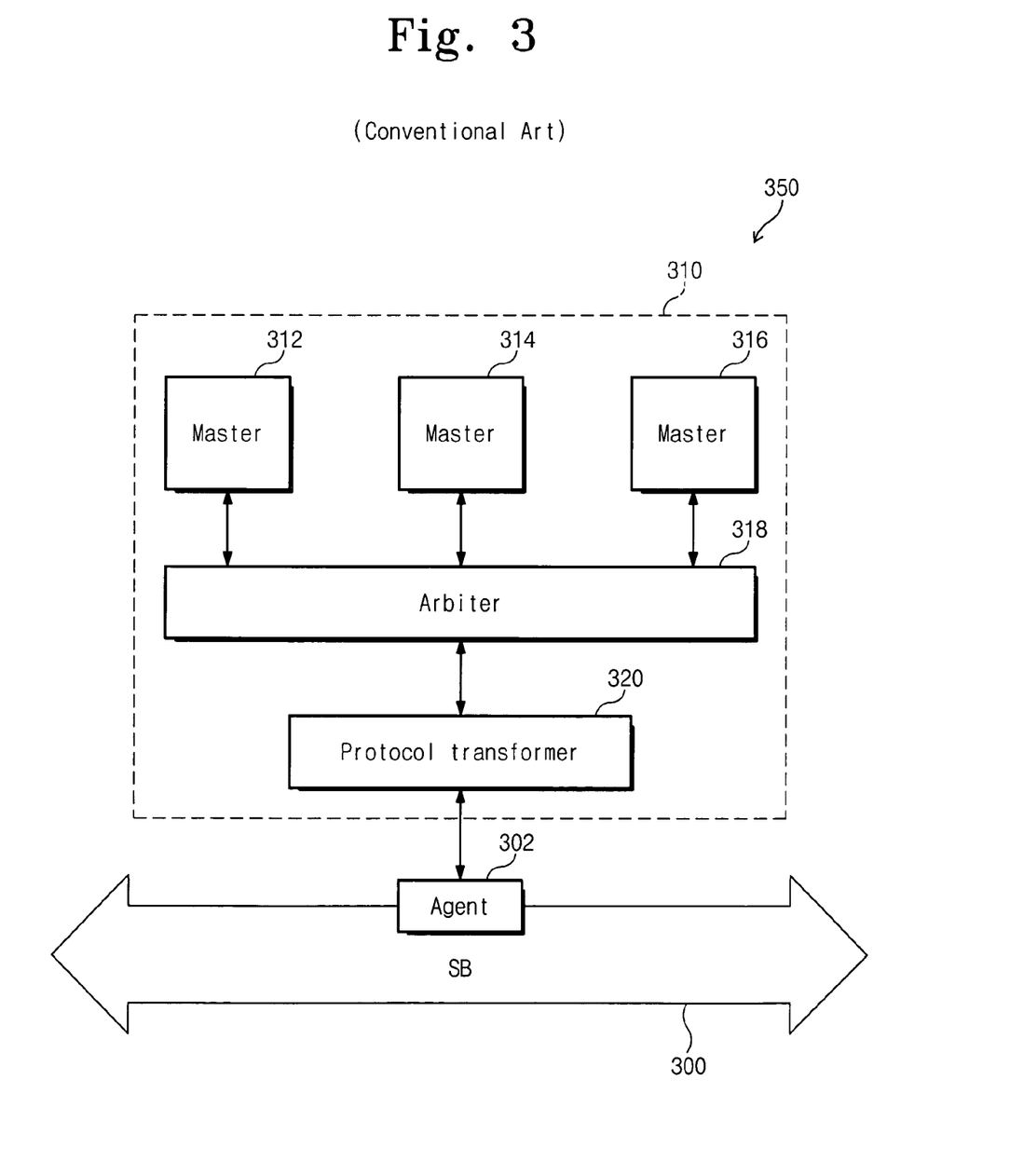
FIG. 3 illustrates a block diagram of another conventional bus system.

FIG. 3 illustrates a block diagram of another conventional bus system 350.

Referring to FIG. 3, the bus system 350 may be based on the AMBA protocol in an AHB system 310, and may include an OCP SB bus 300 accessed through an agent 302.

The AHB system 310 may include masters 312/314/316, an arbiter 318 and a protocol transformer 320. The arbiter 318 may control bus connections for the masters 312/314/316. The protocol transformer 318 may convert protocol (e.g., from AMBA to OCP and vice versa) for a master (e.g., master 312/314/316) which may be selected by the arbiter 318 and may connect the selected master to the SB bus 300 through the agent 302. The masters 312/314/316 may be based on the AMBA protocol. The arbiter 318 may permit the selected master to occupy the bus (i.e., become the bus master) until data transfer is complete (i.e., for either a write and/or read command). The conventional methods of bus arbitration including a plurality of protocols may be incapable of transferring control of the bus (e.g., SB bus 300) to a new bus master before a data operation of a bus master is complete. In other words, a separation of the command phase (i.e., requesting a data transfer) and the response phase (i.e., receiving data from a read command and/or for sending data to be written) may not be possible. Thus, the advantage of separation (e.g., as included in conventional systems using OCP without a protocol conversion) may not be possible in systems including a protocol conversion. Thus, when a plurality of masters attempt to occupy the bus (i.e., become bus masters), a latency time (i.e., a response time) for requests from the masters may be increased, resulting in a degradation (i.e., loss of efficiency) in the conventional bus system.

SUMMARY OF THE INVENTION

An exemplary embodiment of the present invention is a bus system, including a bus arbiter selecting a first one of a plurality of masters to transfer data on a bus with a first protocol, the bus arbiter receiving a read command from the first one of the plurality of masters and transferring bus control to a second one of the plurality of masters before a response to the read command is received.

Another exemplary embodiment of the present invention is a bus system including a bus associated with an open core protocol (OCP), a plurality of masters associated with an advanced microcontroller bus architecture (AMBA) protocol, a bus arbiter transferring bus control between the plurality of masters, and a protocol transformer converting data between the OCP and the AMBA protocol.

Another exemplary embodiment of the present invention is a bus system, including an arbiter granting bus control to one of a plurality of masters in response to a bus request, and generating a bus occupation informing signal indicating bus control to the one of the plurality of masters, and transferring read information from the bus to the one of the plurality of masters, a multiplexer connecting the one of the plurality of masters with the bus in response to bus occupation informing signal, and a demultiplexer transferring the read information data to the one of the plurality of masters.

Another exemplary embodiment of the present invention is a method of arbitrating bus occupation with an open core protocol (OCP) for a plurality of masters, including requesting bus occupation for one of the plurality of masters, granting the bus occupation to the one of the plurality of masters, transferring a first operation for the one of the plurality of masters through the bus, and transferring bus control to another one of the plurality of masters.

Another exemplary embodiment of the present invention is a method of transferring data, including sending a read command from a master with bus control, receiving a response to a read command: storing the response at a bus arbiter, and sending the response to the master, the master not having bus control for a given period between sending the read command and receiving the response.

Another exemplary embodiment of the present invention is a method of transferring data, including sending a read command from a first master with bus control, transferring bus control to a second master, receiving a response to the read command, and sending the response to the first master.

Another exemplary embodiment of the present invention is a bus system, including a bus arbiter for allocating bus control to one of a plurality of masters at a given time, the bus arbiter transferring bus control without waiting for a response to a read command when one of the plurality of masters sends a read command.

BRIEF DESCRIPTION OF THE DRAWINGS

The present invention will become more apparent by describing in detail exemplary embodiments thereof with reference to the attached drawings in which.

DETAILED DESCRIPTION OF THE EXEMPLARY EMBODIMENTS OF THE PRESENT INVENTION

Hereinafter, example embodiments of the present invention will be described in detail with reference to the accompanying drawings.

In the Figures, the same reference numerals are used to denote the same elements throughout the drawings.

Figure 4:
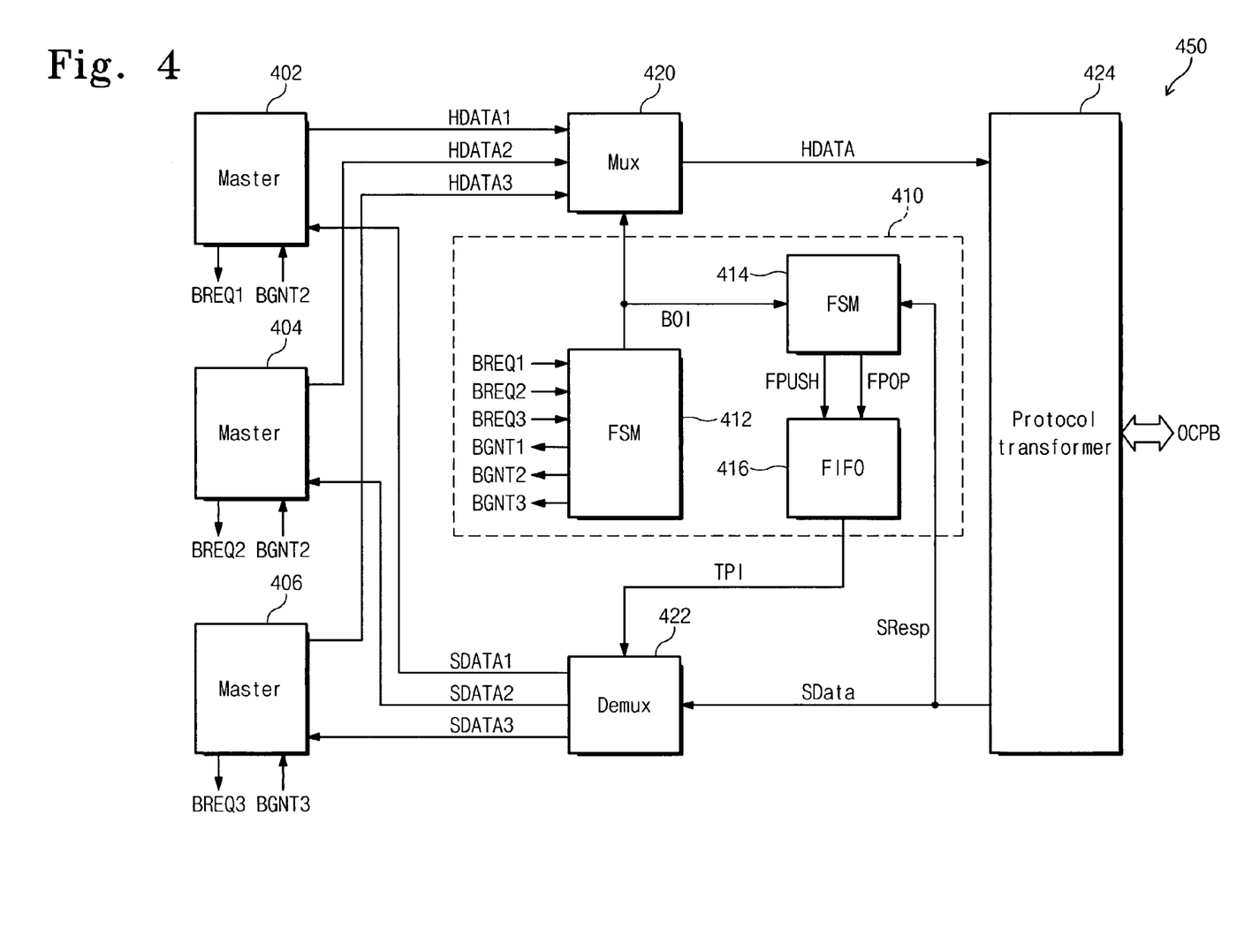
FIG. 4 illustrates a block diagram of a bus system according to an exemplary embodiment of the present invention.

FIG. 4 illustrates a block diagram of a bus system 450 according to an exemplary embodiment of the present invention.

In another exemplary embodiment of the present invention, referring to FIG. 4, the bus system 450 may include masters 402/404/406, a multiplexer 420, a bus arbiter 410, a demultiplexer 422, and/or a protocol transformer 424.

In another exemplary embodiment of the present invention, the masters 402/404/406 may be based on at least one of an open core protocol (OCP) and an advanced microcontroller bus architecture (AMBA) protocol.

In another exemplary embodiment of the present invention, the bus arbiter 410 may be connected to the masters 402/404/406, the multiplexer 420, the demultiplexer 422, and the protocol transformer 424.

In another exemplary embodiment of the present invention, the bus arbiter 410 may include a first finite state machine (FSM) 412, a second FSM 414, and a first-in-first-out (FIFO) memory 416. The first FSM 412 may be connected to the masters 402/404/406, the second FSM 414, and/or the multiplexer 420. The first FSM 412 may receive one of bus granting signals BGNT1/BGNT2/BGNT3 which may designate one of the masters 402/404/406, respectively, as the bus master in response to one of bus request signals BREQ1/BREQ2/BREQ3 received from the masters 402/404/406, respectively. The FSM 412 may apply a bus occupation informing signal BOI indicating that one of masters 402/404/406 is now a bus master to the multiplexer 420 and the second FSM 414.

In another exemplary embodiment of the present invention, the second FSM 414 may be connected to the first FSM 412, the FIFO memory 416, and/or the protocol transformer 424. The second FSM 414 may receive the bus occupation informing signal BOI from the first FSM 412. During an execution of a read command, the FSM 412 may output a push command FPUSH to the FIFO memory 416 to store read information into the FIFO memory 416. The read information may include an identification of the bus master and a burst size of data to be read.

If the read information is received from the protocol transformer 424, the second FSM 414 may determine the volume of the read information and may output a pop command FPOP to the FIFO memory 416 to clear the previous read information when the data is completely transferred to the master (i.e., when the read command completes execution).

In another exemplary embodiment of the present invention, the FIFO memory 416 may be connected to the second FSM 414 and/or the demultiplexer 422. The FIFO memory 416 may store the read information of the bus master (e.g., one of masters 402/404/406) in response to the push command FPUSH, or may clear the read information in response to the pop command FPOP provided from the second FSM 414.

In another exemplary embodiment of the present invention, the FIFO memory 416 may apply a transmission path informing signal TPI. The transmission path informing signal TPI may instruct the FIFO memory 416 to output read information to the demultiplexer 422 in response to the push command FPUSH received from the second FSM 414. The transmission path informing signal TPI may include information associated with the bus master which may receive the read information.

In another exemplary embodiment of the present invention, the multiplexer 420 may be connected to the masters 402/404/406, the first FSM 412, and/or the protocol transformer 424.

In another exemplary embodiment of the present invention, the multiplexer 420 may transfer data of a selected master (e.g., one of masters 402/404/406) to the protocol transformer 424 based on the bus occupation informing signal BOI received from the first FSM 412.

In another exemplary embodiment of the present invention, the demultiplexer 422 may be connected to the FIFO memory 416, the masters 402/404/406, and/or the protocol transformer 424.

In another exemplary embodiment of the present invention, the demultiplexer 422 may transfer data SDATA of the protocol transformer 424 to the bus master based on the transmission path informing signal TPI received from the FIFO memory 416.

In another exemplary embodiment of the present invention, the protocol transformer 424 may be connected to an OCP bus OCPB, the multiplexer 420, the demultiplexer 422, and/or the second FSM 414.

In another exemplary embodiment of the present invention, the protocol transformer 424 may convert data received from the multiplexer 420 into data conforming to the OCP and may supply the conformed OCP data to the OCP bus OCPB. Further, the protocol transformer 424 may apply converted data (i.e., converted from read information transferred through the OCP bus OCPB from a slave based on a read command from a bus master) to the demultiplexer 422 and the second FSM 414.

Figure 5:
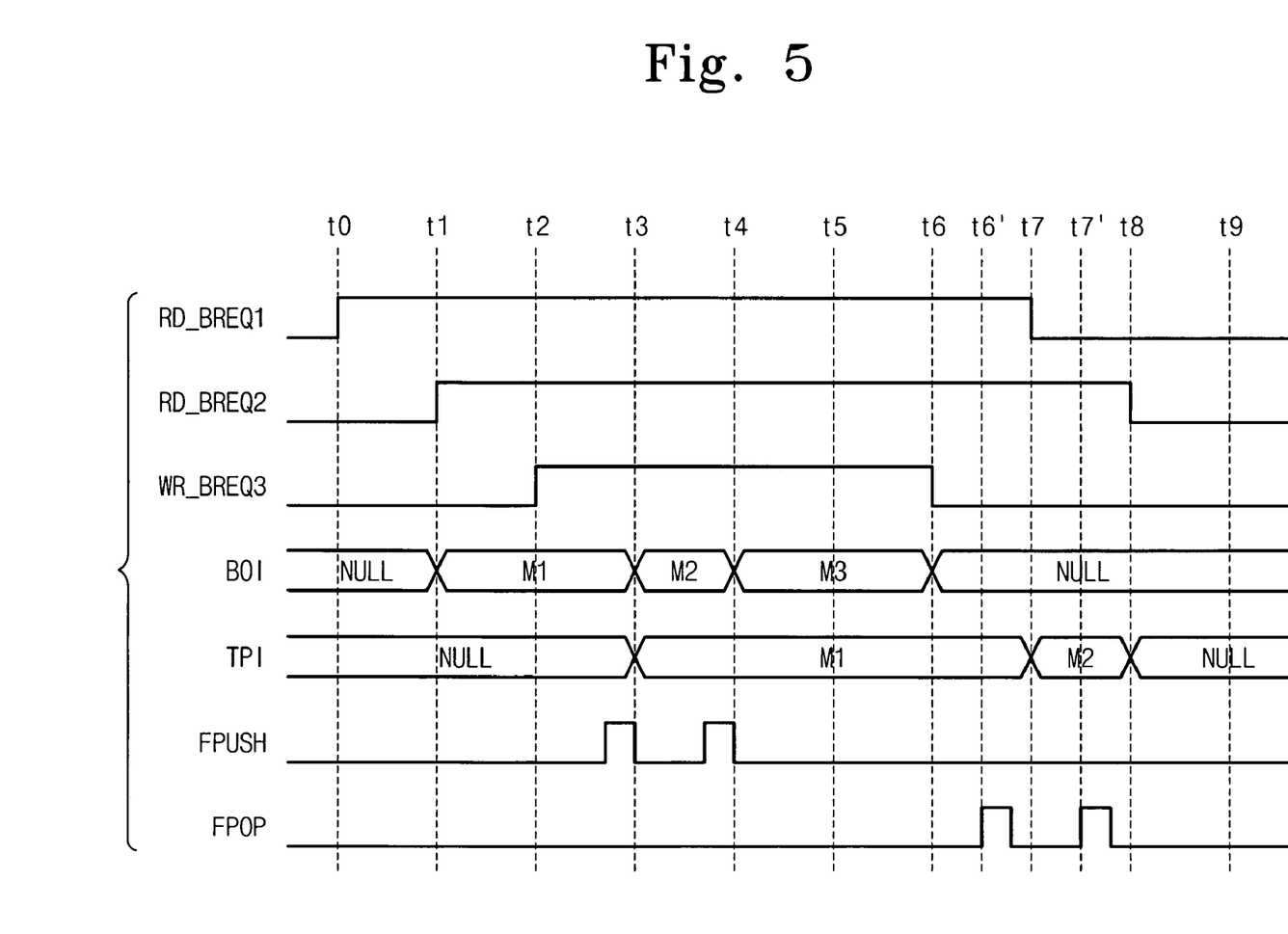
FIG. 5 illustrates a timing diagram based on signals of the bus system of FIG. 4.

FIG. 5 illustrates a timing diagram based on signals of the bus system 450 of FIG. 4.

In another exemplary embodiment of the present invention, referring to FIG. 4, the masters 402 and 404 may execute read commands while the master 406 may execute a write operation.

Figure 6:
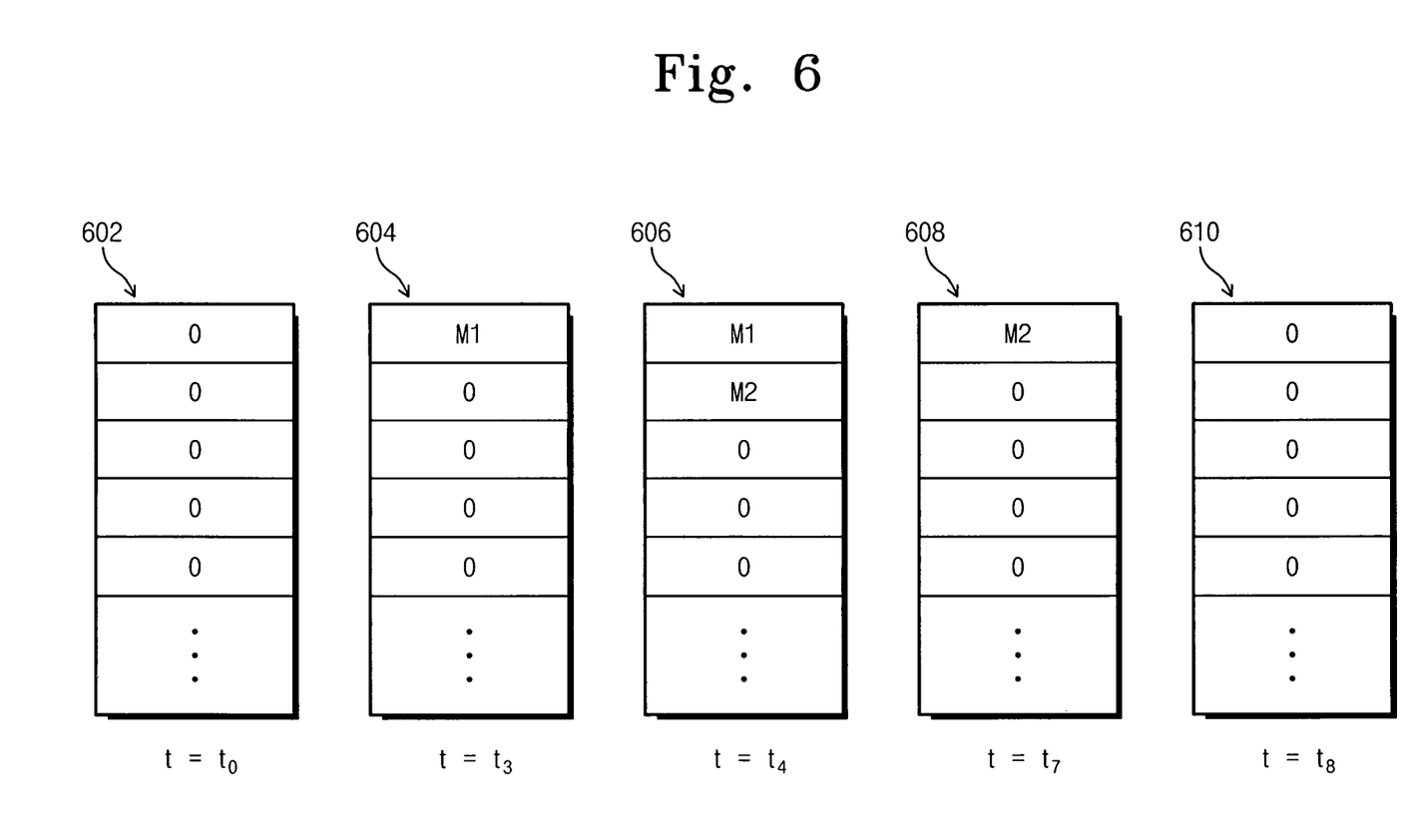
FIG. 6 illustrates data stored in the first-in-first-out (FIFO) memory during the operations shown in FIG. 5.

FIG. 6 illustrates data stored in the FIFO memory 416 during the operations shown in FIG. 5.

In another exemplary embodiment of the present invention, referring to FIGS. 5 and 6, the masters 402 and 404 may apply read bus request signals RD_BREQ1 and RD_BREQ2 to the first FSM 412 at times t0 and t1, respectively, while the master 406 may apply a write bus request signal WR_BREQ3 to the first FSM 412 at a time t3. If the first FSM 412 permits bus occupation (i.e. bus control) for the master 402 at the time t1, the master 402 (i.e., the bus master) may transfer only a read command to the OCP bus OCPB through the multiplexer 420 in a time period including t1, t2 and t3. During the time period including t1, t2 and t3, the first FSM 412 may output the bus occupation informing signal BOI which may inform the second FSM 414 and the multiplexer 420 that the master 402 is the new bus master. The multiplexer 420 may transfer the read command from the master 402 to the bus OCPB through the protocol transformer 424. The second FSM 414 may apply the push command FPUSH to the FIFO memory 416 at the time t3, thereby storing the read information (i.e., read data) for the master 402 into the FIFO memory 416. During time t3, the FIFO memory 416 may store the read information M1 of the master 402 based on the push command FPUSH received from the second FSM 414 (i.e., in 604 of FIG. 6).

In 604 of FIG. 6, when the read information M1 of the master 402 is positioned on the top of the FIFO memory 416 (i.e., at the top of a FIFO stack) at the time t3, the FIFO memory 416 may send the transmission path informing signal TPI to the master 402 and the demultiplexer 422 during time t3. Thus, the first read data (i.e., read information M1) from an external slave (i.e., the device from which the read command requests data) may be transferred to the master 404 (i.e., the next bus master) through the demultiplexer 422.

In another exemplary embodiment of the present invention, during the time t3, if the bus occupation by the master 402 is terminated (i.e., one of masters 404/406 is set as a next bus master), the first FSM 412 may set the master 404 as the next bus master for a time interval including t3 and t4. The master 404 may transfer a read command to the OCP bus OCPB through the multiplexer 420 during the time interval including t3 and t4. During the time interval including t3 and t4, the first FSM 412 may output the bus occupation informing signal BOI, thereby informing the second FSM 414 and the multiplexer 420 that the master 404 is the bus master. The multiplexer 420 may transfer the read command from the master 404 to the OCP bus OCPB through the protocol transformer 424. The second FSM 414 may apply (i.e., send) the push command FPUSH to the FIFO memory 416 at the time t4 to store read information (i.e., read data requested by the read command) for the master 404 into the FIFO memory 416. At the time t4, the FIFO memory 416 may store the read information M2 of the master 404 in response to the push command FPUSH received from the second FSM 414, as illustrated in 606 of FIG. 6.

In another exemplary embodiment of the present invention, at the time t4, if the bus occupation by the master 404 is terminated, the first FSM 412 may grant the bus occupation for the master 406 (i.e., the master 406 becomes the new bus master) and the master 406 may complete a write command during a time interval from t4 to t6. During the time interval from t4 to t6 (i.e., the write operation period), the data stored in the FIFO memory 416 may not be changed.

In another exemplary embodiment of the present invention, when the transmission path informing signal TPI is assigned to the first master 402 at the time t3, the read information (i.e., data sent in response to a read command) may be received from a slave (e.g., a memory device to which the read command is addressed) may be transferred to the master 402 through the demultiplexer 422.

In another exemplary embodiment of the present invention, the read information may be transferred to the master 402 from the slave through the demultiplexer 422 during a time interval from t5 to t6' as shown in FIG. 5. In this case, the second FSM 414 may determine the volume (i.e., size) of the read information and may send the pop command to the FIFO memory 416 at the time t6' which may terminate the transfer of the read information. After outputting the read information M1 of the master 402 from the FIFO memory 416 at a time t7 in response to the pop command FPOP at the time t6', the read information (i.e., read data) stored in the FIFO memory 416 may be sorted as illustrated in 608 of FIG. 6 (i.e., the first read information M1 of the master 402 is removed from the data arrangement in 606 and the second read information M2 of the master 404 is positioned on top of the data arrangement as shown in 608).

In another exemplary embodiment of the present invention, in 608, when the read information M2 at the top of the FIFO memory 416 at the time t7 is assigned to the master 404 (i.e., the read information M2 being data received in response to a read command from the master 404) the transmission path informing signal TPI may be sent to the demultiplexer 422 (i.e., indicating that the master 404 is the new bus master). The next data output from the FIFO memory 416 may be sent to the master 404 through the demultiplexer 422.

In another exemplary embodiment of the present invention, if the read information required by the master 404 at the time t7 is transferred from its corresponding slave, the second FSM 414 may determine the volume (i.e., size) of the read information (i.e., the data sent in response to a read command by the master 404) and the pop command FPOP may be sent to the FIFO memory 416 after the read information has been received.

In another exemplary embodiment of the present invention, if the read information has been completely transferred by a time t7', the second FSM 414 may send the pop command FPOP to the FIFO memory 416 and the FIFO memory 416 may clear (i.e., initialize or remove) the read information M2 positioned on the top of the FIFO memory 416 as shown in 610. Referring to time t8 and/or 610 of FIG. 6, the TPI value may be set to a NULL state when the FIFO memory 416 is clear since there may be no remaining masters with read and/or write commands.

In another exemplary embodiment of the present invention, a bus system including a first protocol and a second protocol may separate a transfer phase and a response phase. In an example, a bus system including both OCP and AMBA protocols may separate a transfer phase and a response phase, thereby obtaining the advantage of conventional systems including only OCP to systems including both OCP and other protocols.

In another exemplary embodiment of the present invention, above-described exemplary embodiments may reduce transmission times of commands (e.g., write commands, read commands, etc. . . . ) from the masters by pipelining operations (i.e., performing more commands in parallel).

The exemplary embodiments of the present invention being thus described, it will be obvious that the same may be varied in many ways. For example, above-described protocols (OCP, AMBA, etc.) are given as examples only and any well known bus protocol may be included in any of the exemplary embodiments. Also, given numbers of elements (e.g., masters, slaves, agents, etc.) as described in exemplary embodiments are included as examples only, and any number of any element may be used. Further, above-described read commands may refer to any request for data (e.g., a data acquiring portion of a write operation, a read command, etc. . . . ).

Such variations are not to be regarded as departure from the spirit and scope of the example embodiments of the present invention, and all such modifications as would be obvious to one skilled in the art are intended to be included within the scope of the following claims.

What is claimed is:

1. A bus system, comprising:
    a bus arbiter selecting a first one of a plurality of masters to transfer data on a bus with a first protocol, the bus arbiter receiving a read command from the first one of the plurality of masters and transferring bus control to a second one of the plurality of masters before a response to the read command is received at the bus arbiter.

2. The bus system of claim 1, further comprising:
    a protocol transformer for converting a second protocol associated with the plurality of masters when the first protocol is an open core protocol (OCP) and the second protocol is not an OCP.

3. The bus system of claim 1, wherein the bus arbiter transfers bus control to the second one of the plurality of masters after the read command is sent from the bus arbiter to the bus.

4. The bus system of claim 1, wherein the first one of the plurality of masters has bus control until a write command and write data are transferred through the bus arbiter to the bus during a write operation.

5. The bus system of claim 1, wherein the bus arbiter stores read information associated with at least one read command from the first one of the plurality of masters.

6. The bus system of claim 1, wherein the bus arbiter includes:
    a bus granting unit for assigning bus control to the second one of the plurality of masters in response to a request for bus control from the second one of the plurality of masters and generating a bus occupation informing signal for the second one of the plurality of masters information;
    a multiplexer connecting the second one of the masters to the bus in response to the bus occupation informing signal; and
    a demultiplexer transferring the read information to the second one of the plurality of masters.

7. The bus system of claim 1, wherein at least one of the plurality of masters are IP cores based on an advanced microcontroller bus architecture (AMBA) protocol.

8. The bus system of claim 1, wherein the read command is a portion of a write command, the portion requesting data to be written in the write command.

9. The bus system of claim 2, wherein the protocol transformer is connected between the bus and the bus arbiter.

10. The bus system of claim 3, wherein the bus arbiter transfers bus control to the first one of the plurality of masters when the response to the read command is received at the bus arbiter.

11. The bus system of claim 5, wherein the read information includes at least one of an identification and a burst size of the read information received in response to the read command.

12. The bus system of claim 6, wherein the bus granting unit includes:
    a first circuit granting bus control to the second one of the plurality of masters in response to the request for the bus occupation from the second one of the plurality of masters and generating the bus occupation informing signal; and
    a read data processor storing read information during a read operation in response to the bus occupation informing signal, applying a transmission path informing signal to the demultiplexer, and permitting a transfer of read information to the second one of the plurality of masters when the read information is received from the bus.

13. The bus system of claim 12, wherein the read information includes at least one of an identification and a burst size of the read information received in response to the read command.

14. The bus system of claim 12, wherein the transmission path informing signal is based on the read information.

15. The bus system according to claim 12, wherein the read data processor includes:
   a read information memory storing the read information and outputting the transmission path informing signal; and
   a second circuit for applying a first control signal to the read information memory to store the read information into the information memory and applying a second control signal to the information memory to clear read information stored in the read information memory.

16. The bus system of claim 12, wherein the first circuit is a finite state machine.

17. The bus system of claim 15, wherein the read information memory is a first-in-first-out (FIFO) memory.

18. The bus system of claim 15, wherein the second circuit is a finite state machine.

19. A bus system, comprising:
   a bus associated with an open core protocol (OCP);
   a plurality of masters associated with an advanced microcontroller bus architecture (AMBA) protocol;
   a bus arbiter transferring bus control to a second one of the plurality of masters without waiting for a response from a first one of the plurality of masters to be received at the bus arbiter; and
   a protocol transformer converting data between the OCP and the AMBA protocol.

20. The bus system of claim 19, wherein the bus arbiter allocates bus control to one of the plurality of masters at a given time and transfers bus control without waiting for a response to a read command when one of the plurality of masters sends a read command.

21. The bus system of claim 19, wherein the bus arbiter stores read information associated with at least one of the plurality of masters during a read operation.

22. The bus system of claim 19, wherein one of the plurality of masters maintains bus control until a write command and write data are received during a write operation.

23. The bus system of claim 19, wherein one of the plurality of masters maintains bus control until a read command is received during a read operation.

24. The bus system of claim 19, wherein the bus arbiter includes:
   a bus granting unit for assigning bus control to one of the plurality of masters in response to a request for bus control from the one of the plurality of masters, and generating a bus occupation informing signal for the one of the plurality of masters;
   a multiplexer connecting the one of the masters to the bus in response to the bus occupation informing signal; and
   a read data processor storing read information during a read operation in response to the bus occupation informing signal and transferring of the read information to the one of the plurality of masters.

25. The bus system of claim 19, wherein the read command is a portion of a write command, the portion requesting data to be written in the write command.

26. The bus system of claim 20, wherein the read command is a portion of a write command, the portion requesting data to be written in the write command.

27. The bus system of claim 20, wherein the bus arbiter transfers control to another one of the plurality of masters when the read command completes transmission on the bus.

28. The bus system of claim 24, wherein the read data processor includes:
   a read information memory storing the read information and outputting the transmission path informing signal; and
   a circuit for applying a first control signal to the read information memory to store the read information into the read information memory and applying a second control signal to the read information memory to clear read information stored in the read information memory.
   a demultiplexer transferring information to the one of the plurality of masters.

29. The bus system of claim 24, wherein the bus granting unit is a finite state machine.

30. The bus system of claim 28, wherein the read information memory is a first-in-first-out (FIFO) memory.

31. The bus system according to claim 28, wherein the circuit is a finite state machine.

32. A bus system, comprising:
   an arbiter granting bus control to one of a plurality of masters in response to a bus request, generating a bus occupation informing signal indicating bus control to the one of the plurality of masters, transferring bus control to another one of the plurality of masters before a response to a read command is received at the bus arbiter, and transferring read information data from the bus to the one of the plurality of masters;
   a multiplexer connecting the one of the plurality of masters with the bus in response to a bus occupation informing signal; and
   a demultiplexer transferring the read information data to the one of the plurality of masters.

33. The bus system of claim 32, wherein the arbiter stores read information associated with at least one of the plurality of masters in a sequence during a read operation.

34. A bus system of claim 32, wherein the arbiter includes:
   a bus granting unit for assigning bus control to one of the plurality of masters in response to a request for bus control from the one of the plurality of masters and generating the bus occupation informing signal for the one of the plurality of masters; and
   a read data processor storing read information during a read operation in response to the bus occupation informing signal and applying a transmission path informing signal to the demultiplexer to control the transfer of the read information to the one of the plurality of masters.

35. The bus system of claim 33, wherein the read information includes an identification of an alternative master and a burst size of read information to be read out by the alternative master.

36. The bus system of claim 33, wherein the read command is a portion of a write command, the portion requesting data to be written in the write command.

37. The bus system of claim 34, wherein the read data processor includes:
   a read information memory storing read information and generating the transmission path informing signal; and
   a circuit storing the read information into the read information memory and clearing a portion of the stored read information when the portion is output to one of the plurality of masters.

38. The bus system of claim 34, wherein the bus granting unit is a finite state machine.

39. The bus system of claim 37, wherein the read information memory is a first-in-first-out (FIFO) memory.

40. The bus system of claim 37, wherein the circuit is a finite state machine.

41. A method of arbitrating bus occupation with an open core protocol (OCP) for a plurality of masters, comprising:
requesting bus occupation from a bus arbiter for one of the plurality of masters;
granting the bus occupation to the one of the plurality of masters;
transferring a first operation for the one of the plurality of masters through the bus to the bus arbiter; and
transferring bus control to another one of the plurality of masters before a response to the first operation is received at the bus arbiter.

42. The method of claim 41, wherein the first operation is at least one of a write command and a read command.

43. The method of claim 41, further comprising:
converting between a protocol used by the plurality of masters and the open core protocol (OCP).

44. The method of claim 41, wherein the one of the plurality of masters maintains bus occupation until a write command and write data are sent on the bus during a write operation.

45. A bus system for performing the method of claim 41.

46. The method of claim 43, wherein the protocol is an advanced microcontroller bus architecture (AMBA) protocol.

47. A method of transferring data, comprising:
sending a read command from a master with bus control;
receiving a response to the read command and storing the response at a bus arbiter; and
sending the response to the master, the master not having bus control for a given period between sending the read command and receiving the response.

48. The method of 47, wherein the read command is a portion of a write command, the portion requesting data to be written in the write command.

49. A bus system for performing the method of claim 47.

50. A method of transferring data, comprising:
sending a read command from a first master with bus control;
transferring bus control to a second master;
receiving a response to the read command;
storing the response to the read command at a bus arbiter; and
sending the response to the first master, wherein transferring bus control to the second master occurs before receiving the read response to the read command.

51. The method of 50, wherein the read command is a portion of a write command, the portion requesting data to be written in the write command.

52. A bus system for performing the method of claim 50.

* * * * *